H. W. VAN MEETEREN.
TIRE SECURING DEVICE.
APPLICATION FILED MAR. 7, 1918.

1,331,541.

Patented Feb. 24, 1920.

Inventor:-
Harry William van Meeteren,
By:- B. Singer, Atty.

UNITED STATES PATENT OFFICE.

HARRY WILLIAM VAN MEETEREN, OF EDGBASTON, BIRMINGHAM, ENGLAND.

TIRE-SECURING DEVICE.

1,331,541.   Specification of Letters Patent.   Patented Feb. 24, 1920.

Application filed March 7, 1918. Serial No. 221,006.

*To all whom it may concern:*

Be it known that I, HARRY WILLIAM VAN MEETEREN, a subject of the Queen of Holland, residing at 58 Poplar Road, Edgbaston, Birmingham, in the county of Warwick, England, engineer, have invented an Improved Tire-Securing Device, of which the following is a specification.

This invention relates to the type of pneumatic or elastic tire cover which is furnished with solid block-like base portions, within the interior of which circumferential metallic reinforcing members are embedded, and in which connecting means are incorporated adapted to couple the base portions together prior to the assemblage of the cover in its carrier rim.

The connecting means for coupling the base portions of the tire cover together comprise a series of short channel members or sections, the flanges or side webs of which are adapted to externally embrace the base portions of the tire. These channel members are assembled in relation to appropriately recessed parts of the base portions of the tire so that they do not produce any surface projections, and the separable parts of the divisible carrier rim in which the tire is assembled are adapted to grip the base portions of the tire in order to prevent creeping.

In order to positively provide for the prevention of creeping, the channel-shaped or other members for coupling the base portions of the tire together are adapted to so coöperate with the carrier rim or member that they are locked from circumferential movement in relation thereto. For this purpose one or more transverse or other projections are provided upon that face of the transverse part of the U-shaped coupling member which is adjacent to the cylindrical part of the carrier rim, such projection or projections being adapted to engage within a corresponding recess or recesses in this part of the carrier rim so that the coupling members are thereby effectively locked from circumferential movement, and such coupling members thus retain the tire from creeping by reason of the connection which they have with the tire by virtue of the recesses in the latter in which the coupling members are located.

The torque provision which is provided respectively upon or in the transverse parts of the U-shaped coupling members, and upon or in the adjacent cylindrical part of the carrier rim, involves surfaces which converge transversely of the plane of the wheel in the direction in which the tire is displaced when being assembled.

In order that this invention may be clearly understood and readily carried into practice, reference may be had to the appended explanatory drawing, which illustrates separately the various parts of a tire and rim according to the present invention.

Figure 1:
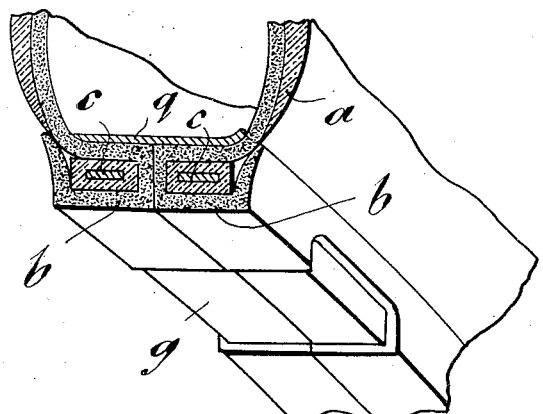
Figure 1 is a sectional perspective view of the tire.
Figure 2:
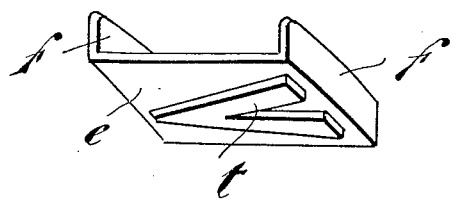
Fig. 2 is a perspective view of the clamping member.
Figure 3:
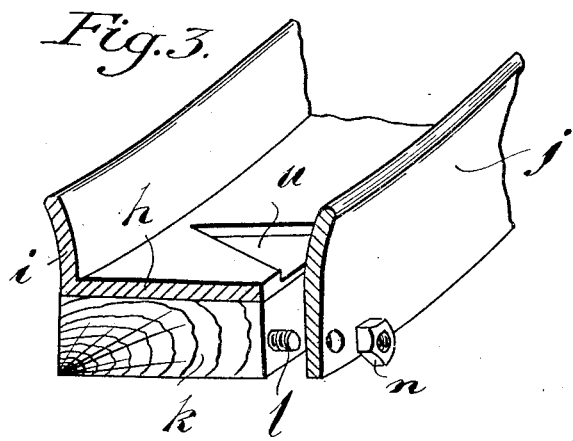
Fig. 3 is a sectional perspective, showing a portion of the felly and rim.

In the drawings, $a$ is the tire cover, having rectangular base portions $b, b$ in each of which an endless steel band or ribbon $c$ is incorporated. Each element $c$ is encircled with a rubber covering $d$, which latter is in turn encircled by the canvas portion of the tire. $e$ designates the channel members, the flanges or side webs $f$ of which are adapted to externally embrace the base portions of the tire. These channel members $e$ are assembled in relation to appropriately recessed parts $g$ of the base portions of the tire so that they remain in frictional engagement therewith and do not produce any surface projections.

$q$ is an annular flap of canvas or other suitable material secured to one of the base portions $b$ and adapted to cover the division occurring between said base portions.

Each channel member $f$ is formed at its under face with a V-shaped projection $t$, and said V-shaped projection $t$ is adapted to engage within a V-shaped slot $u$ in the base of the carrier rim $h$. When the tire is assembled, there is no difficulty in introducing all of the minor extremities of the V-shaped projections $t$ into the major extremities of the V-shaped recesses $u$, and when the tire is in position an effective fit or coöperation occurs between the V-shaped projections $t$ and recesses $u$ which effectively prevents creeping in both directions.

The carrier rim may comprise a cylindrical steel band $h$ forming the base of the rim and having an integral web or flange $i$ on one side, a separable or detachable web or flange in the nature of a plate or ring $j$ being adapted to be secured in relation to the other side of the cylindrical portion of the steel rim. The cylindrical portion of the rim may be mounted upon a suitable wooden or other felly $k$, on to which felly the separable portion $j$ of the rim may be secured. In one method of attaching the portion $j$, projecting screwed stems $l$ fixed within the felly $k$ are adapted to pass through perforations in the separable flange, which latter is secured by nuts $n$ assembled outside of the flange upon the screwed stems.

What I claim as my invention and desire to secure by Letters Patent is:—

The combination of a tire having separable base portions, channel members having side flanges which externally embrace the base portions of the tire and also having a recess which extends thereacross and also into said side flanges, a U-shaped clamping member arranged in said recess and having a V-shaped projection on the underside, and a rim having a detachable flange, said rim also having a V-shaped recess to receive the said projection and open at its broad end on the side of the rim next the said detachable flange.

In witness whereof I have hereunto set my hand in the presence of two witnesses.

HARRY WILLIAM van MEETEREN.

Witnesses:
 ARTHUR H. BROWN,
 EDGAR N. WHEELER.